(12) United States Patent
Chun et al.

(10) Patent No.: US 12,506,573 B2
(45) Date of Patent: Dec. 23, 2025

(54) 1X LTF SEQUENCE FOR 240MHz

(71) Applicant: LG Electronics Inc., Seoul (KR)

(72) Inventors: Jinyoung Chun, Seoul (KR); Jinsoo Choi, Seoul (KR); Dongguk Lim, Seoul (KR); Eunsung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 317 days.

(21) Appl. No.: 18/011,424

(22) PCT Filed: May 28, 2021

(86) PCT No.: PCT/KR2021/006680
§ 371 (c)(1),
(2) Date: Dec. 19, 2022

(87) PCT Pub. No.: WO2021/256726
PCT Pub. Date: Dec. 23, 2021

(65) Prior Publication Data
US 2023/0246768 A1  Aug. 3, 2023

(30) Foreign Application Priority Data

Jun. 19, 2020 (KR) .................. 10-2020-0075112
Jun. 19, 2020 (KR) .................. 10-2020-0075166
Jun. 25, 2020 (KR) .................. 10-2020-0078003

(51) Int. Cl.
*H04L 5/00* (2006.01)
*H04W 84/12* (2009.01)

(52) U.S. Cl.
CPC ............ *H04L 5/0048* (2013.01); *H04W 84/12* (2013.01)

(58) Field of Classification Search
CPC ......... H04L 5/0048; H04L 1/00; H04L 27/26; H04L 27/26132; H04L 27/2613;
(Continued)

(56) References Cited

U.S. PATENT DOCUMENTS

2013/0170411 A1* 7/2013 Vermani ............... H04L 1/0001
370/310
2017/0181034 A1 6/2017 Lee et al.
(Continued)

FOREIGN PATENT DOCUMENTS

| EP | 4358479 A2 * | 4/2024 | ......... H04L 25/0226 |
| WO | WO2020022707 | 1/2020 | |
| WO | WO2020096349 | 5/2020 | |

OTHER PUBLICATIONS

Lim et al., "1x LTF sequence for 11bd," IEEE 802.11-19/1849r3, Nov. 2019, 20 pages.
(Continued)

*Primary Examiner* — Ayaz R Sheikh
*Assistant Examiner* — Louis Samara
(74) *Attorney, Agent, or Firm* — Fish & Richardson P.C.

(57) ABSTRACT

A wireless local area network (LAN) system wherein a transmitting station (STA) may generate a physical protocol data unit (PPDU), the transmitting STA may transmit the PPDU over a 240 MHz band, the PPDU may include a long training field (LTF) signal, and the LTF signal may be generated on the basis of an LTF sequence for the 240 MHz band.

6 Claims, 10 Drawing Sheets

(58) Field of Classification Search
CPC . H04L 27/2603; H04L 1/0001; H04L 5/0094;
H04W 84/12; H04W 72/04
See application file for complete search history.

(56) References Cited

U.S. PATENT DOCUMENTS

| | | | |
|---|---|---|---|
| 2019/0149294 A1* | 5/2019 | Pawar | H04L 5/0094 |
| | | | 370/329 |
| 2019/0289612 A1* | 9/2019 | Chen | H04L 27/2613 |
| 2022/0103317 A1* | 3/2022 | Park | H04L 27/26132 |
| 2022/0140962 A1* | 5/2022 | Park | H04L 27/2603 |
| | | | 370/330 |
| 2022/0311566 A1* | 9/2022 | Liang | H04L 27/262 |
| 2023/0016370 A1* | 1/2023 | Kim | H04L 5/0053 |

OTHER PUBLICATIONS

Liu et al., "HE-LTF Sequence Design," IEEE 802.11-15/1334r1, Nov. 2015, 37 pages.

* cited by examiner (a)

| L-STF | L-LTF | L-SIG | RL-SIG | U-SIG | EHT-SIG | EHT-STF | EHT-LTF | Data |

1X LTF SEQUENCE FOR 240MHz

CROSS-REFERENCE TO RELATED APPLICATIONS

This application is a National Stage application under 35 U.S.C. § 371 of International Application No. PCT/KR2021/006680, filed on May 28, 2021, which claims the benefit of Korean Patent Application No. 10-2020-0075112, filed on Jun. 19, 2020, Korean Patent Application No. 10-2020-0075166, filed on Jun. 19, 2020 and Korean Patent Application No. 10-2020-0078003, filed on Jun. 25, 2020. The disclosures of the prior applications are incorporated by reference in their entirety.

TECHNICAL FIELD

The present specification relates to a 1x LTF sequence for 240 MHz band transmission in a wireless local area network (WLAN) system.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

In a wireless local area network (WLAN) system according to various embodiments, a transmitting station (STA) may generate a physical protocol data unit (PPDU). The transmitting STA may generate a physical protocol data unit (PPDU). The transmitting STA may transmit the PPDU through a 240 MHz band. The PPDU may include a Long Training Field (LTF) signal. The LTF signal may be generated based on an LTF sequence for the 240 MHz band. The LTF sequence may be defined as follows.

{$1^{st}$ sequence, zero sequence, $2^{nd}$ sequence, zero sequence, $3^{rd}$ sequence}, $1^{st}$ sequence={$4^{th}$ sequence, 0, $5^{th}$ sequence},
$2^{nd}$ sequence={$-4^{th}$ sequence, 0, $5^{th}$ sequence},
$3^{rd}$ sequence={$-4^{th}$ sequence, 0, $-5^{th}$ sequence},
$4^{th}$ sequence={−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +10, 0, 0, −1, 0, 0, 0, 0, −1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, +1, 0, 0, 0, +10, 0, 0, +1, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, 0, −1, 0, 0, 0, −1, 0, 0, 0, −1, 0, 0, 0, −1, 0, 0, 0, +1, 0, 0, 0, 0, −1, 0, 0, 0, +1, 0, 0, 0, +1, 0, 0, 0, +1, 0, 0, 0, −1, 0, 0, 0, 0, −1, 0, 0, 0, +1, 0, 0, 0, +1, 0, 0, 0, −1, 0, 0, 0, 0, +1, 0, 0, 0, −1, 0, 0, 0, +1, 0, 0, 0, +1, 0, 0, 0, +10, 0, 0, +1, 0, 0, 0, +1, 0, 0, 0, +1, 0, 0, 0, −1, 0, 0, 0, −1, 0, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, 0, +1, 0, 0, 0, +1, 0, 0, 0, +1, 0, 0, 0, +1, 0, 0, 0, +1, 0, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, 0}, $5^{th}$ sequence={0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, 0, −1, 0, 0, 0, +1, 0, 0, 0, +1, 0, 0, 0, −1, 0, 0, 0, +1, 0, 0, 0, 0, 0, −1, 0, 0, 0, +1, 0, 0, 0, +1, 0, 0, 0, +1, 0, 0, 0, +1, 0, 0, 0, 0, +1, 0, 0, 0, +1, 0, 0, 0, +1, 0, 0, 0, −1, 0, 0, 0, −1, 0, 0, 0, 0, +1, 0, 0, 0, +1, 0, 0, 0, −1, 0, 0, 0, +1, 0, 0, 0, −1, 0, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, 0, −1, 0, 0, 0, +1, 0, 0, 0, −1, 0, 0, 0, +1, 0, 0, 0, 0, −1, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, 0, −1, 0, 0, 0, +1, 0, 0, 0, −1, 0, 0, 0, +1, 0, 00, +1, 0, 0, 0, 0, +1, 0, 0, 0, +1, 0, 0, 0, −1.00, 0, +1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 00, 0, +1, 0, 0, 0, +1, 0, 0, 0, +1, 0, 0, 0, +1, 0, 0, 0, +1, 0, 0, 0, +1, 0, 0, 0, 0, +1, 0, 00, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, 0, +1, 0, 0, 0, −1, 0, 0, 0, −1, 0, 0, 0, +1, 0, 0, 0, −1, 0, 0, 0, 0, +1, 0, 0, 0, 0, −1, 0, 0, 0, +1, 0, 0, 0, +1, 0, 0, 0, +1, 0, 0, 0, +1, 0, 0, 0, −1, 0, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, 0, −1, 0, 0, 0, −1, 0, 0, 0, +1, 0, 0, 0, +1}.

According to an example of the present specification, a 1xLTF signal for a 240 MHz band may be transmitted and received.

BRIEF DESCRIPTION OF THE DRAWINGS

FIG. 6 illustrates an example of a PPDU used in the present specification.

DETAILED DESCRIPTION

Figure 1:
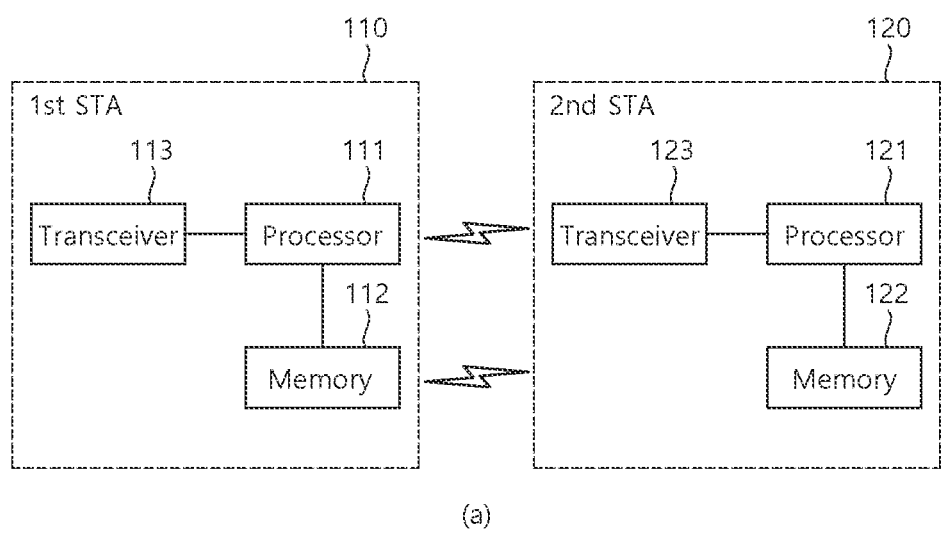
FIG. 1 shows an example of a transmitting apparatus and/or receiving apparatus of the present specification.
Figure 1:
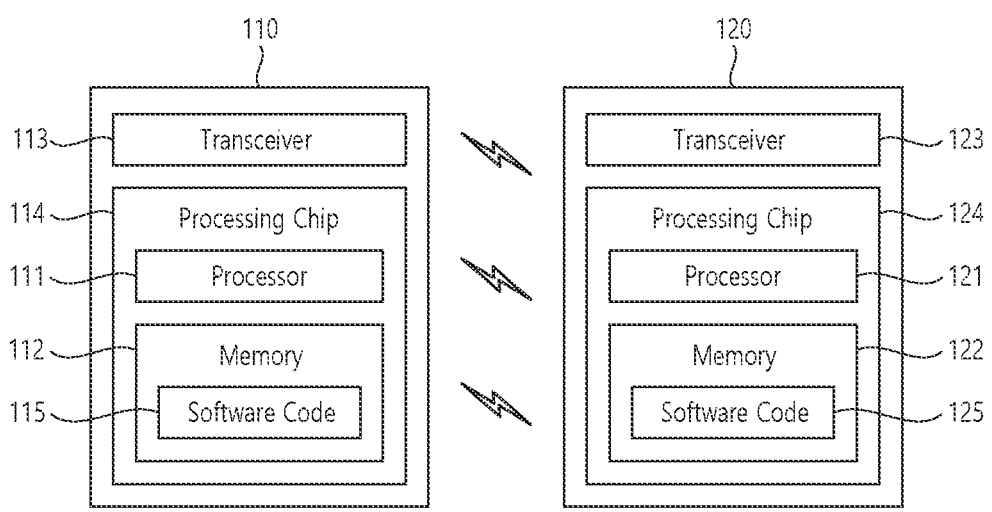

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B. and C" may mean "only A", "only B", "only C", or "any combination of A, B. and C". In addition. "at least one of A, B. or C" or "at least one of A. B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 11 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 1 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
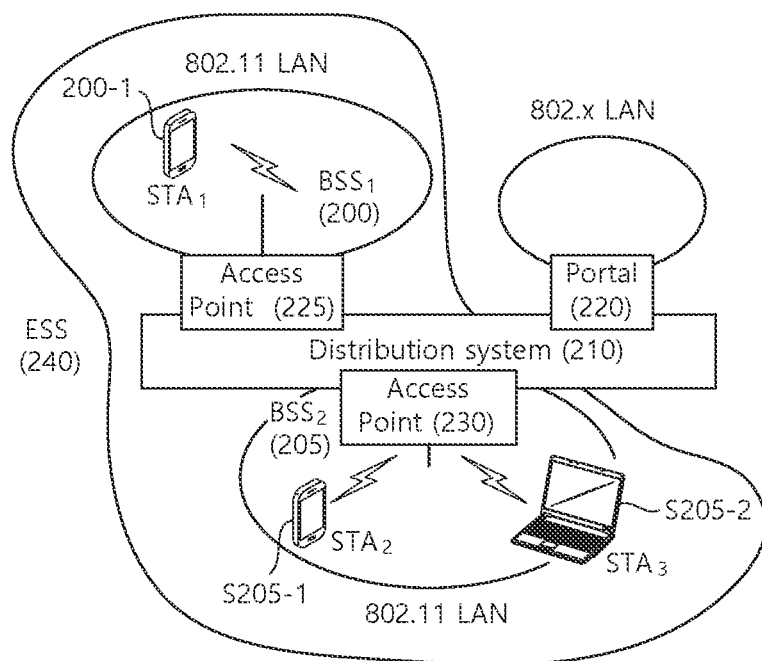
FIG. 2 is a conceptual view illustrating the structure of a wireless local area network (WLAN).
Figure 2:
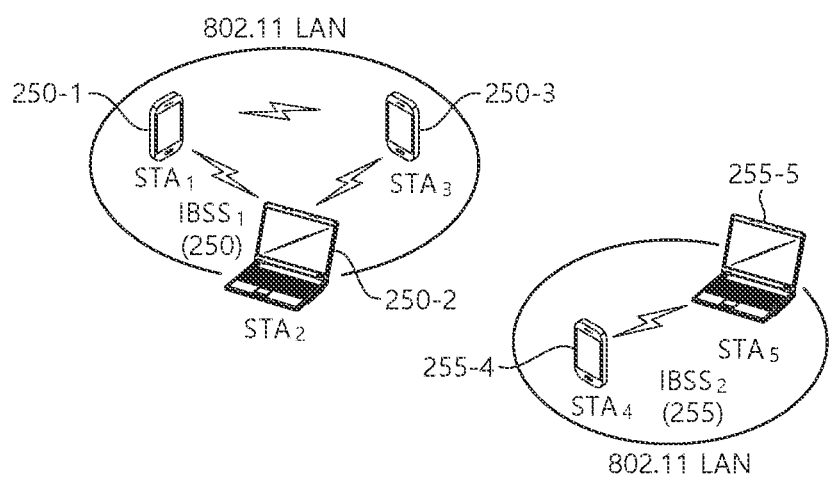

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
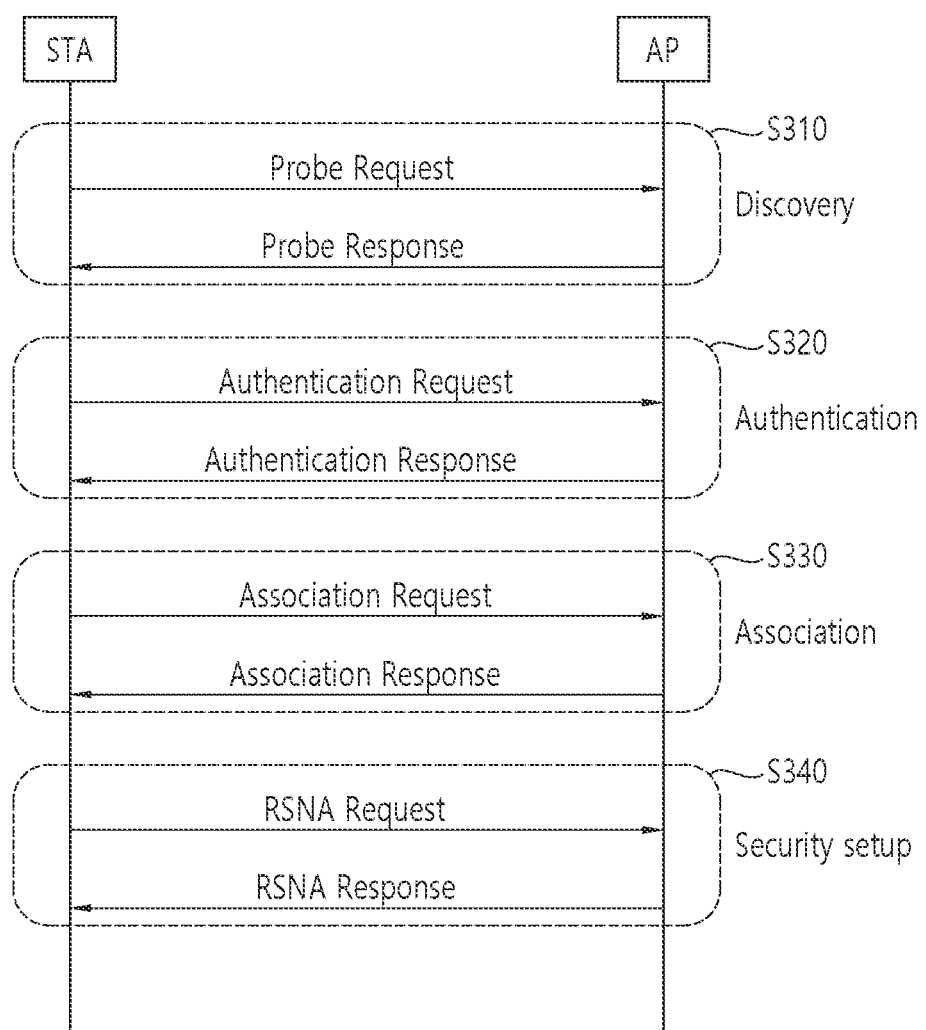
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
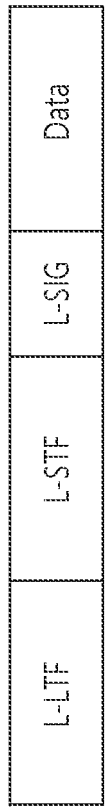
FIG. 4 illustrates an example of a PPDU used in an IEEE standard.
Figure 4:
Figure 4:
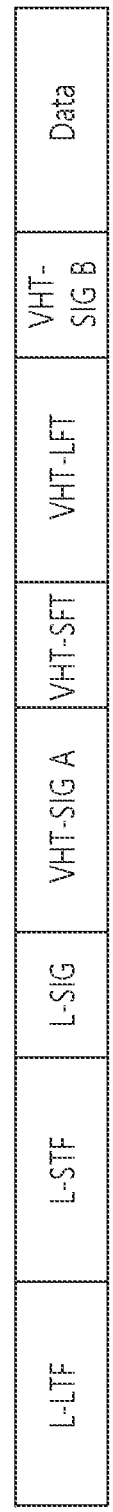
Figure 4:
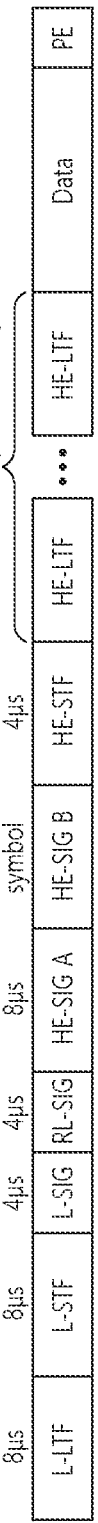

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
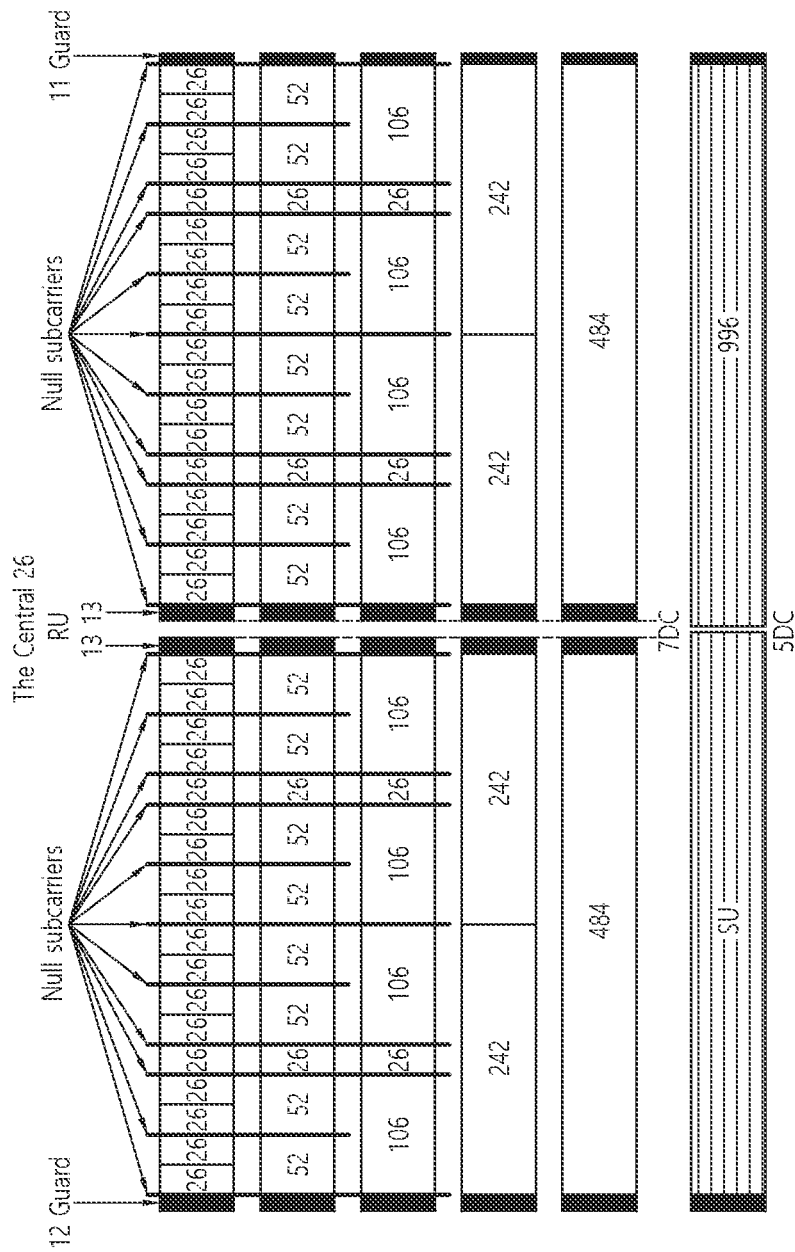
FIG. 5 illustrates a layout of RUs used in a band of 80 MHz.

FIG. 5 illustrates a layout of RUs used in a band of 80 MHz.

Figure 7:
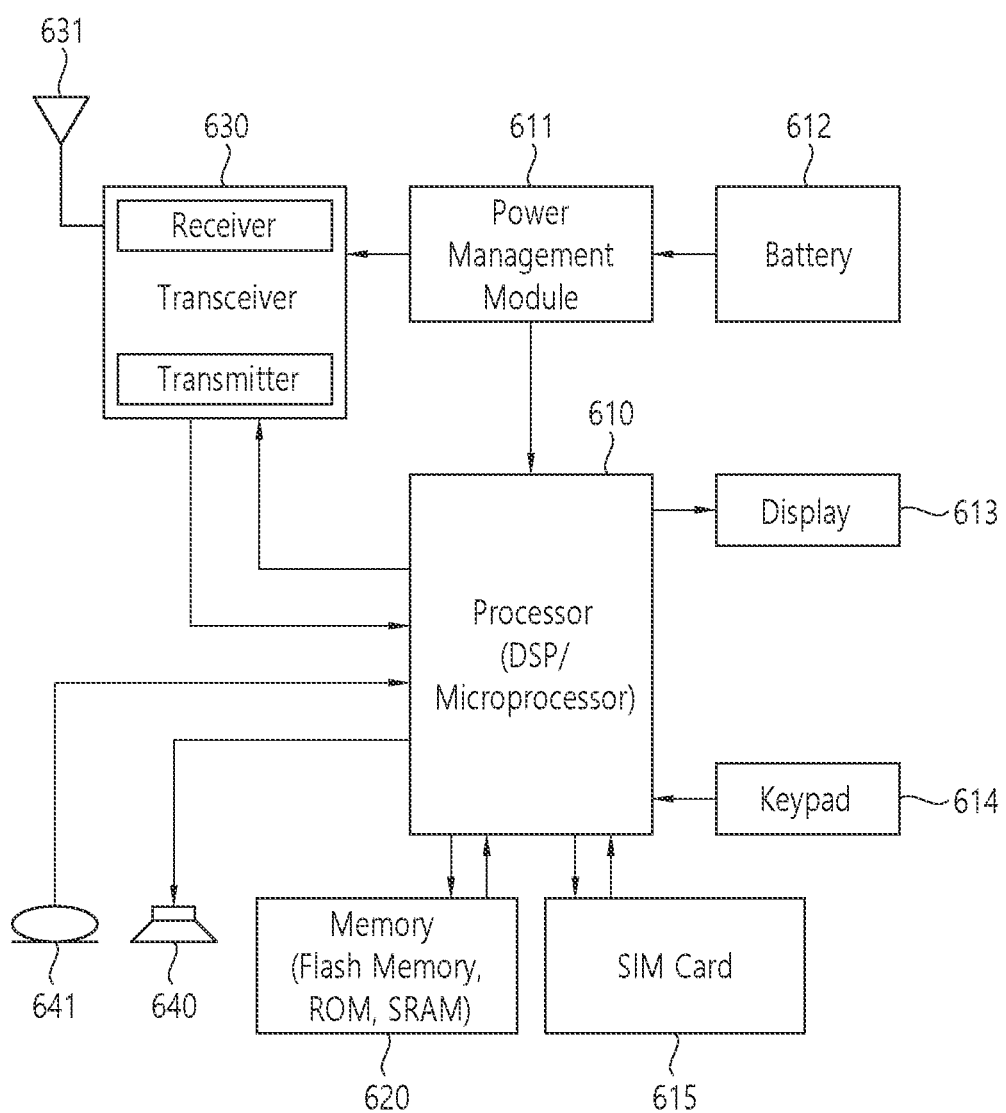
FIG. 7 illustrates an example of a modified transmission device and/or receiving device of the present specification.

Referring to FIG. 5, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Hereinafter, a PPDU transmitted/received in a STA of the present specification will be described.

FIG. 6 illustrates an example of a PPDU used in the present specification.

The PPDU of FIG. 6 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 6 may indicate the entirety or part of a PPDU type used in the EHT system. For example, the example of FIG. 6 may be used for both of a single-user (SU) mode and a multi-user (MU) mode. In other words, the PPDU of FIG. 6 may be a PPDU for one receiving STA or a plurality of receiving STAs. When the PPDU of FIG. 6 is used for a trigger-based (TB) mode, the EHT-SIG of FIG. 6 may be omitted. In other words, a STA which has received a trigger frame for uplink-MU (UL-MU) may transmit the PPDU in which the EHT-SIG is omitted in the example of FIG. 6.

In FIG. 6, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 6, the L-LTE and the L-STF may be the same as those in the conventional fields.

The L-SIG field of FIG. 6 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT. HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 6. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 µs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones. i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG;

5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 6. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80, +80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80, +80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 6 may include control information for the receiving STA. The EHT-SIG may be transmitted through at least one symbol, and one symbol may have a length of 4 µs. Information related to the number of symbols used for the EHT-SIG may be included in the U-SIG.

An HE-STF of FIG. 6 may be used for improving automatic gain control estimation in a multiple input multiple output (MIMO) environment or an OFDMA environment. An HE-LTF of FIG. 6 may be used for estimating a channel in the MIMO environment or the OFDMA environment.

The EHT-LTF may have first, second, and third types (i.e., 1×, 2×, 4× LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 µs. In addition, a GI (e.g., 0.8/1/6/3.2 µs) having various lengths may be applied to the first/second/third type LTF.

Information related to a type of STF and/or LTF (information related to a GI applied to LTF is also included) may be included in a SIG-A field and/or SIG-B field or the like of FIG. 6.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 6. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UU/DL) packet, a (TX/RX/UL/DL) data unit, (TX/RX/UL/DL) data, or the like may be a signal transmitted/received based on the PPDU of FIG. 6. The PPDU of FIG. 6 may be used to transmit/receive frames of various types. For example, the PPDU of FIG. 6 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 6 may be used for a management frame. An example of the management frame may include a beacon frame, a (re-)association request frame, a (re-)association response frame, a probe request frame, and a probe response frame. For example, the PPDU of FIG. 6 may be used for a data frame. For example, the PPDU of FIG. 6 may be used to simultaneously transmit at least two or more of the control frame, the management frame, and the data frame.

FIG. 7 illustrates an example of a modified transmission device and/or receiving device of the present specification.

Each device/STA of the sub-figure (a)/(b) of FIG. 1 may be modified as shown in FIG. 7. A transceiver 630 of FIG. 7 may be identical to the transceivers 113 and 123 of FIG. 1. The transceiver 630 of FIG. 7 may include a receiver and a transmitter.

A processor 610 of FIG. 7 may be identical to the processors 111 and 121 of FIG. 1. Alternatively, the processor 610 of FIG. 7 may be identical to the processing chips 114 and 124 of FIG. 1.

A memory 620 of FIG. 7 may be identical to the memories 112 and 122 of FIG. 1. Alternatively, the memory 620 of FIG. 7 may be a separate external memory different from the memories 112 and 122 of FIG. 1.

Referring to FIG. 7, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 7, a speaker 640 may output a result related to a sound processed by the processor 610. A microphone 641 may receive an input related to a sound to be used by the processor 610.

A 20 MHz-band 1x HE-LTF specified in the existing 802.11ax, i.e., HE, is as follows.

$HELTF_{-122,122}=$
{0, 0, −1, 0, 0, 0, +1, 0, 0, 0, +1, 0, 0, 0, −1, 0, 0, 0, +1,
0, 0, 0, −1, 0, 0, 0, +1, 0, 0, 0, +1, 0, 0, 0, +1, 0, 0, 0,
+1, 0, 0, 0, −1, 0, 0, 0, −1, 0, 0, +1, 0, 0, 0, +1, 0, 0, +1,
0, 0, 0, −1, 0, 0, 0, −1, 0, 0, 0, −1, 0, 0, 0, +1, 0, 0, 0,
−1, 0, 0, 0, −1, 0, 0, 0, +1, 0, 0, 0, +1, 1, 0, 0, 0, −1, 0,
0, 0, −1, 0, 0, 0, +1, 0, 0, 0, −1, 0, 0, 0, −1, 0, 0, 0, +1,
0, 0, 0, −1, 0, 0, 0, −1, 0, 0, 0, +1, 0, 0, 0, −1, 0, 0,
0, +1, 0, 0, 0, +1, 0, 0, 0, +1, 0, 0, 0, −1, 0, 0, 0, −1, 0,
0, 0, −1, 0, 0, 0, −1, 0, 0, 0, −1, 0, 0, 0, +1, 0, 65
0, −0, 0, 0, −1, 0, 0, 0, −1, 0, 0, 0, +1, 0, 0, 0, −1, 0, 0,
0, −1, 0, 0, 0, +1, 0, 0, 0, −1, 0, 0, 0, −1, 0, 0, 0, +1, 0,
0, 0, −1, 0, 0, 0, +1, 0, 0, 0, −1, 0, 0, 0, −1, 0, 0, 0, −1,
0, 0, 0, −1, 0, 0, 0, −1, 0}

A 40 MHz-band 1x HE-LTF specified in the existing 802.11ax, i.e., HE, is as follows.

$HELTF_{-244,244}=$
{+1, 0, 0, 0, +1, 0, 0, 0, +1, 0, 0, 0, +1, 0, 0, 0, −1, 0, 0,
0, +1, 0, 0, 0, 0, +1, 0, 0, 0, −1, 0, 0, 0, −1, 0, 0, 0, +1,
0, 0, 0, −1, 0, 0, 0, +1, 0, 0, 0, −1, 0, 0, 0, +1, 0, 0, 0,
−1, 0, 0, 0, −1, 0, 0, 0, +1, 0, 0, 0, −1, 0, 0, 0, +1, 0, 0,
0, +1, 0, 0, 0, +1, 0, 0, 0, −1, 0, 0, 0, −1, 0, 0, 0, +1, 0,
0, 0, +1, 0, 0, 0, +1, 0, 0, 0, +1, 0, 0, 0, +1, 0, 0, 0, +1,
0, 0, 0, +1, 0, 0, 0, +1, 0, 0, 0 −1, 0, 0, +1, 0, 0, 0, +1,
0, 0, 0, −1, 0, 0, 0, −1, 0, 0, +1, 0, 0, 0, −1, 0, 0, 0, +1,
0, 0, 0, −1, 0, 0, 0, +1, 0, 0, 0, −1, 0, 0, 0, −1, 0, 0, 0,
+1, 0, 0, 0, −1, 0, 0, 0, +1, 0, 0, 0, +1, 0, 0, 0, +1, 0, 0,
0, −1, 0, 0, 0, −1, 0, 0, 0, −1, 0, 0, 0, +1, 0, 0, 0, +1, 0,
0, 0, +1, 0, 0, 0, −1, 0, 0, 0, +1, 0, 0, 0, −1, 0, 0, 0, +1,
0, 0, 0, −1, 0, 0, 0, −1, 0, 0, 0, −1, 0, 0, 0, 0, 0, 0, +1,
0, 0, 0, +1, 0, 0, 0, −1, 0, 0, 0, −1, 0, 0, 0, +1, 0, 0, 0,
−1, 0, 0, 0, +1, 0, 0, 0, +1, 0, 0, 0, +1, 0, 0, 0, +1, 0, 0,
0, +1, 0, 0, 0, +1, 0, 0, 0, −1, 0, 0, 0, +1, 0, 0, 0, +1, 0,
0, 0, −1, 0, 0, 0, −1, 0, 0, 0, +1, 0, 0, 0, −1, 0, 0, 0, +1,
0, 0, 0, +1, 0, 0, 0, +1, 0, 0, 0, +1, 0, 0, 0, +1, 0, 0, 0,
−1, 0, 0, 0, +1, 0, 0, 0, −1, 0, 0, 0, −1, 0, 0, 0, −1, 0, 0,
0, +1, 0, 0, 0, +1, 0, 0, 0, −1, 0, 0, 0, −1, 0, 0, 0, 0, −1,
0, 0, 0, +1, 0, 0, 0, −1, 0, 0, 0, −1, 0, 0, 0, −1, 0, 0,
−1, 0, 0, 0, +1, 0, 0, 0, −1, 0, 0, 0, −1, 0, 0, 0, −1, 0, 0,
0, +1, 0, 0, 0, −1, 0, 0, 0, 0, 0, 0, 0, 0, 0, 0, −1,
0, 0, −1, 0, 0, 0, −1, 0, 0, 0, −1, 0, 0, 0, +1, 0, 0, 0, −1,
0, 0, 0, +1, 0, 0, 0, +1, 0, 1, 0, +1, 0, 0, 0, −1, 0, 0, 0,
−1, 0, 0, 0, +1, 0, 0, 0, +1}

An 80 MHz-band 1x HE-LTF specified in the existing 802.11ax, i.e., HE, is as follows.

80 MHz:

$HELTF_{-500,500}=$
{−1, 0, 0, 0, −1, 0, 0, 0, +1, 0, 0, 0, +1, 0, 0, 0, +1, 0, 0,
0, +1, 0, 0, 0, −1, 0, 0, 0, −1, 0, 0, 0, −1, 0, 0, 0, −1, 0,
0, 0, +1, 0, 0, 0, +1, 0, 0, 0, −1, 0, 0, 0, −1, 0, 0, 0, +1,
0, 0, 0, −1, 0, 0, 0, +1, 0, 0, 0, −1, 0, 0, 0, −1, 0, 0, 0,
−1, 0, 0, 0, −1, 0, 0, 0, −1, 0, 0, 0, −1, 0, 0, 0, +1, 0, 0,
0, +1, 0, 0, 0, −1, 0, 0, 0, −1, 0, 0, 0, +1, 0, 0, 0, −1, 0,
0, 0, +1, 0, 0, 0, −1, 0, 0, 0, −1, 0, 0, 0, −1, 0, 0, 0, −1,
0, 0, 0, −1, 0, 0, 0, +1, 0, 0, 0, +1, 0, 0, 0, −1, 0, 0, 0,
−1, 0, 0, 0, +1, 0, 0, 0, −1, 0, 0, 0, +1, 0, 0, 0, −1, 0, 0,
0, +1, 0, 0, 0, +1, 0, 0, 0, +1, 0, 0, 0, −1, 0, 0, 0, +1, 0,
0, 0, −1, 0, 0, 0, −1, 0, 0, 0, +1, 0, 0, 0, +1, 0, 0, 0, −1,
0, 0, 0, +1, 0, 0, 0, −1, 0, 0, 0, +1, 0, 0, 0, −1, 0, 0, 0,
−1, 0, 0, 0, −1, 0, 0, 0, −1, 0, 0, 0, +1, 0, 0, 0, −1, 0, 0,
0, −1, 0, 0, 0, −1, 0, 0, 0, −1, 0, 0, 0, −1, 0,
0, 0, +1, 0, 0, 0, +1, 0, 0, 0, +1, 0, 0, 0, −1, 0, 0, 0, −1,
0, 0, 0, +1, 0, 0, 0, −1, 0, 0, 0, −1, 0, 0, +1, 0, 0, 0, −1,
0, 0, 0, +1, 0, 0, 0, +1, 0, 0, 0, +1, 0, 0, 0, +1, 0, 0, 0,
+1, 0, 0, 0, +1, 0, 0, 0, −1, 0, 0, 0, −1, 0, 0, 0, +1, 0, 0,
0, +1, 0, 0, 0, −1, 0, 0, 0, +1, 0, 0, 0, −1, 0, 0, 0, +1, 0,
0, 0, +1, 0, 0, 0, +1, 0, 0, 0, +1, 0, 0, 0, −1, 0, 0, 0, +1,
0, 0, 0, +1, 0, 0, 0, −1, 0, 0, 0, −1, 0, 0, 0, +1, 0, 0, 0,
+1, 0, 0, 0, +1, 0, 0, 0, 0, −1, 0, 0, 0, +1, 0, 0, 0, +1, 0,
0, +1, 0, 0, 0, −1, 0, 0, 0, +1, 0, 0, 0, −1, 0, 0, 0, −1, 0,
0, 0, +1, 0, 0, 0, +1, 0, 0, 0, −1, 0, 0, 0, +1, 0, 0, 0, −1,
0, 0, 0, +1, 0, 0, 0, −1, 0, 0, 0, −1, 0, 0, 0, −1, 0, 0, 0,
−1, 0, 0, 0, +1, 0, 0, 0, −1, 0, 0, 0, +1, 0, 0, 0, −1, 0, 0,
0, −1, 0, 0, 0, 0, 0, 0, 0, −1, 0, 0, 0, +1, 0, 0, 0, +1, 0,
0, 0, −1, 0, 0, 0, −1, 0, 0, 0, +1, 0, 0, 0, +1, 0, 0, 0, −1,
0, 0, 0, −1, 0, 0, 0, +1, 0, 0, 0, +1, 0, 0, 0, −1, 0, 0, 0,
+1, 0, 0, 0, −1, 0, 0, 0, −1, 0, 0, 0, +1, 0, 0, 0, +1, 0, 0,
0, +1, 0, 0, 0, +1, 0, 0, 0, +1, 0, 0, 0, −1, 0, 0, 0, −1, 0,
0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0,
+1, 0, 0, 0, −1, 0, 0, 0, −1, 0, 0, 0, +1, 0, 0, 0, −1, 0, 0,
0, −1, 0, 0, 0, +1, 0, 0, 0, +1, 0, 0, 0, +1, 0, 0, 0, −1, 0,
0, 0, +1, 0, 0, 0, −1, 0, 0, 0, +1, 0, 0, 0, +1, 0, 0, 0, +1,
0, 0, 0, +1, 0, 0, 0, −1, 0, 0, 0, −1, 0, 0, 0, +1, 0, 0, 0,
−1, 0, 0, 0, +1, 0, 0, 0, −1, 0, 0, 0, +1, 0, 0, 0, −1, 0, 0,
0, −1, 0, 0, 0, +1, 0, 0, 0, +1, 0, 0, 0, +1, 0, 0, 0, −1, 0,
0, 0, −1, 0, 0, 0, +1, 0, 0, 0, +1, 0, 0, 0, −1, 0, 0, 0, +1,
0, 0, 0, −1, 0, 0, 0, +1, 0, 0, 0, −1, 0, 0, 0, +1, 0, 0, 0,
+1, 0, 0, 0, +1, 0, 0, 0, +1, 0, 0, 0, −1, 0, 0, 0, −1, 0, 0,
0, +1, 0, 0, 0, +1, 0, 0, 0, −1, 0, 0, 0, +1, 0, 0, 0, −1, 0,
0, 0, +1, 0, 0, 0, +1, 0, 0, 0, +1, 0, 0, 0, +1, 0, 0, 0, −1,
0, 0, 0, +1, 0, 0, 0, +1, 0, 0, 0, −1, 0, 0, 0, −1, 0, 0, 0,
+1, 0, 0, 0, −1, 0, 0, 0, +1, 0, 0, 0, −1, 0, 0, 0, +1, 0, 0,
0, +1, 0, 0, 0, +1, 0, 0, 0, +1, 0, 0, 0, −1, 0, 0, 0, −1, 0,
0, 0, −1, 0, 0, 0, +1, 0, 0, 0, +1, 0, 0, 0, −1, 0, 0, 0, +1,
0, 0, 0, −1, 0, 0, 0, +1, 0, 0, 0, −1, 0, 0, 0, −1, 0, 0, 0,
−1, 0, 0, 0, −1, 0, 0, 0, +1, 0, 0, 0, −1, 0, 0, 0, −1, 0, 0,
0, −1, 0, 0, 0, −1, 0, 0, 0, −1, 0, 0, 0, +1, 0, 0, 0, +1}

A 160 MHz-band 1x HE-LTF specified in the existing 802.11ax, i.e., HE, is as follows.

160 MHz:

$HELTF_{-1012,1012}=$
{$LTF_{80MHz\_lower\_1x}$, 0, 0, 0, 0, 0, 0, 0, 0, 0, 0, 0, 0, 0, 0, 0, 0, 0, 0, 0, 0, 0, $LTF_{80MHz\_upper\_1x}$}

$LTF_{80MHz\_lower\_1x}=\{LTF_{80MHz\_left\_1x}, 0, LTF_{80MHz\_right\_1x}\}$ shall be used in the lower 80 MHz frequency segment $LTF_{80MHz\_upper\_1x}=\{LTF_{80MHz\_left\_1x}, 0, -LTF_{80MHz\_right\_1x}\}$ shall be used in the upper 80 MHz frequency segment $LTF_{80MHz\_left\_1x}=\{-1, 0, 0, 0, -1, 0, 0, 0, +1, 0, 0, 0, +1,$
0, 0, 0, +1, 0, 0, 0, +1, 0, 0, 0, +1, 0, 0, 0, −1, 0, 0, 0,
−1, 0, 0, 0, −1, 0, 0, 0, +1, 0, 0, 0, +1, 0, 0, 0, −1, 0, 0,
0, −1, 0, 0, 0, +1, 0, 0, 0, −1, 0, 0, +1, 0, 0, 0, −1, 0, 0,
0, −1, 0, 0, 0, −1, 0, 0, 0, −1, 0, 0, 0, −1, 0,
0, 0, +1, 0, 0, 0, +1, 0, 0, 0, −1, 0, 0, 0, −1, 0, 0, 0, +1,
0, 0, 0, −1, 0, 0, 0, +1, 0, 0, 0, −1, 0, 0, 0, −1, 0, 0, 0,
−1, 0, 0, 0, −1, 0, 0, 0, −1, 0, 0, 0, +1, 0, 0, 0, +1, 0, 0,
0, −1, 0, 0, 0, −1, 0, 0, 0, +1, 0, 0, 0, −1, 0, 0, 0, +1, 0,
0, 0, −1, 0, 0, 0, +1, 0, 0, 0, +1, 0, 0, 0, +1, 0, 0, 0, +1,
0, 0, 0, +1, 0, 0, 0, −1, 0, 0, 0, −1, 0, 0, 0, +1, 0, 0, 0,
+1, 0, 0, 0, −1, 0, 0, 0, +1, 0, 0, 0, −1, 0, 0, 0, +1, 0, 0,
0, −1, 0, 0, 0, −1, 0, 0, 0, −1, 0, 0, 0, −1, 0, 0, 0, +1, 0,
0, 0, −1, 0, 0, 0, −1, 0, 0, 0, −1, 0, 0, 0, −1, 0, 0, 0, −1,
0, 0, 0, −1, 0, 0, 0, +1, 0, 0, 0, +1, 0, 0, 0, +1, 0, 0, 0,
−1, 0, 0, 0, +1, 0, 0, 0, −1, 0, 0, 0, +1, 0, 0, 0, −1, 0, 0,
0, +1, 0, 0, 0, −1, 0, 0, 0, +1, 0, 0, 0, −1, 0, 0, 0, +1, 0,
0, 0, +1, 0, 0, 0, +1, 0, 0, 0, +1, 0, 0, 0, −1, 0, 0, 0, −1,
0, 0, 0, +1, 0, 0, 0, +1, 0, 0, 0, −1, 0, 0, 0, −1, 0, 0, 0,
−1, 0, 0, 0, +1, 0, 0, 0, +1, 0, 0, 0, +1, 0, 0, 0, −1, 0, 0,
0, −1, 0, 0, 0, +1, 0, 0, 0, −1, 0, 0, 0, −1, 0, 0, 0, −1, 0,
0, 0, −1, 0, 0, 0, −1, 0, 0, 0, +1, 0, 0, 0, −1, 0, 0, 0, +1,
0, 0, 0, +1, 0, 0, 0, +1, 0, 0, 0, +1, 0, 0, 0, +1, 0, 0, 0,
−1, 0, 0, 0, −1, 0, 0, +1, 0, 0, 0, +1, 0, 0, 0, −1, 0, 0, 0,
+1, 0, 0, 0, −1, 0, 0, 0, +1, 0, 0, 0, −1, 0, 0, 0, −1, 0, 0,
0, 0, −1, 0, 0, 0, −1, 0, 0, 0, +1, 0, 0, 0, −1, 0, 0, 0, −1,
0, 0, 0, −1, 0, 0, 0, −1, 0, 0}

$LTF_{80MHz\_right\_1x}=\{-1, 0, 0, 0, +1, 0, 0, 0, +1, 0, 0, 0, -1,$
0, 0, 0, −1, 0, 0, 0, +1, 0, 0, 0, +1, 0, 0, 0, −1, 0, 0, 0,
−1, 0, 0, 0, −1, 0, 0, 0, +1, 0, 0, 0, +1, 0, 0, 0, −1, 0, 0,
0, +1, 0, 0, 0, −1, 0, 0, 0, +1, 0, −1, 0, 0, 0, −1, 0, 0, 0,
0, +1, 0, 0, 0, +1, 0, 0, 0, +1, 0, 0, 0, +1, 0, 0, 0, +1, 0,
0, 0, +1, 0, 0, 0, +1, 0, 0, 0, −1, 0, 0, 0, −1, 0, 0, 0, +1,
0, 0, 0, −1, 0, 0, 0, −1, 0, 0, 0, +1, 0, 0, 0, +1, 0, 0, 0,
−1, 0, 0, 0, −1, 0, 0, 0, −1, 0, 0, 0, +1, 0, 0, 0, +1, 0, 0,
0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1,
0, 0, 0, +1, 0, 0, 0, −1, 0, 0, 0, −1, 0, 0, 0, +1, 0, 0, 0,
+1, 0, 0, 0, −1, 0, 0, 0, −1, 0, 0, 0, +1, 0, 0, 0,
0, −1, 0, 0, 0, −1, 0, 0, 0, −1, 0, 0, 0, −1, 0, 0, 0, +1, 0,
0, 0, −1, 0, 0, 0, −1, 0, 0, 0, −1, 0, 0, 0, −1, 0, 0, 0, −1,
0, 0, 0, −1, 0, 0, 0, +1, 0, 0, 0, +1, 0, 0, 0, +1, 0, 0, 0,
−1, 0, 0, 0, +1, 0, 0, 0, −1, 0, 0, 0, +1, 0, 0, 0, −1, 0, 0,
0, +1, 0, 0, 0, −1, 0, 0, 0, +1, 0, 0, 0, −1, 0, 0, 0, +1, 0,
0, 0, +1, 0, 0, 0, +1, 0, 0, 0, +1, 0, 0, 0, −1, 0, 0, 0, −1,
0, 0, 0, +1, 0, 0, 0, +1, 0, 0, 0, −1, 0, 0, 0, −1, 0, 0, 0,
−1, 0, 0, 0, +1, 0, 0, 0, +1, 0, 0, 0, +1, 0, 0, 0, −1, 0, 0,
0, −1, 0, 0, 0, +1, 0, 0, 0, −1, 0, 0, 0, −1, 0, 0, 0, −1, 0,
0, 0, −1, 0, 0, 0, +1, 0, 0, 0, +1, 0, 0, 0, −1, 0, 0, 0, 0,
+1, 0, 0, 0, −1, 0, 0, 0, +1, 0, 0, 0, −1, 0, 0, 0, −1, 0, 0,
0, 0, −1, 0, 0, 0, −1, 0, 0, 0, +1, 0, 0, 0, −1, 0, 0, 0, −1,
0, 0, 0, −1, 0, 0, 0, −1, 0, 0, 0}

In case of 80, +80 MHz transmission using the 1x HE-LTF, a lower 80 MHz frequency segment shall use the 80 MHz 1xHE-LTF sequence of $HELTF_{-500,500}=LTF_{80MHz\_lower\_1x}$, and an upper 80 MHz frequency segment shall use the 80 MHz 1xHE-LTF sequence of $HELTF_{-500, 500}=LTF_{80MHz\_upper\_1x}$.

Figure 8:
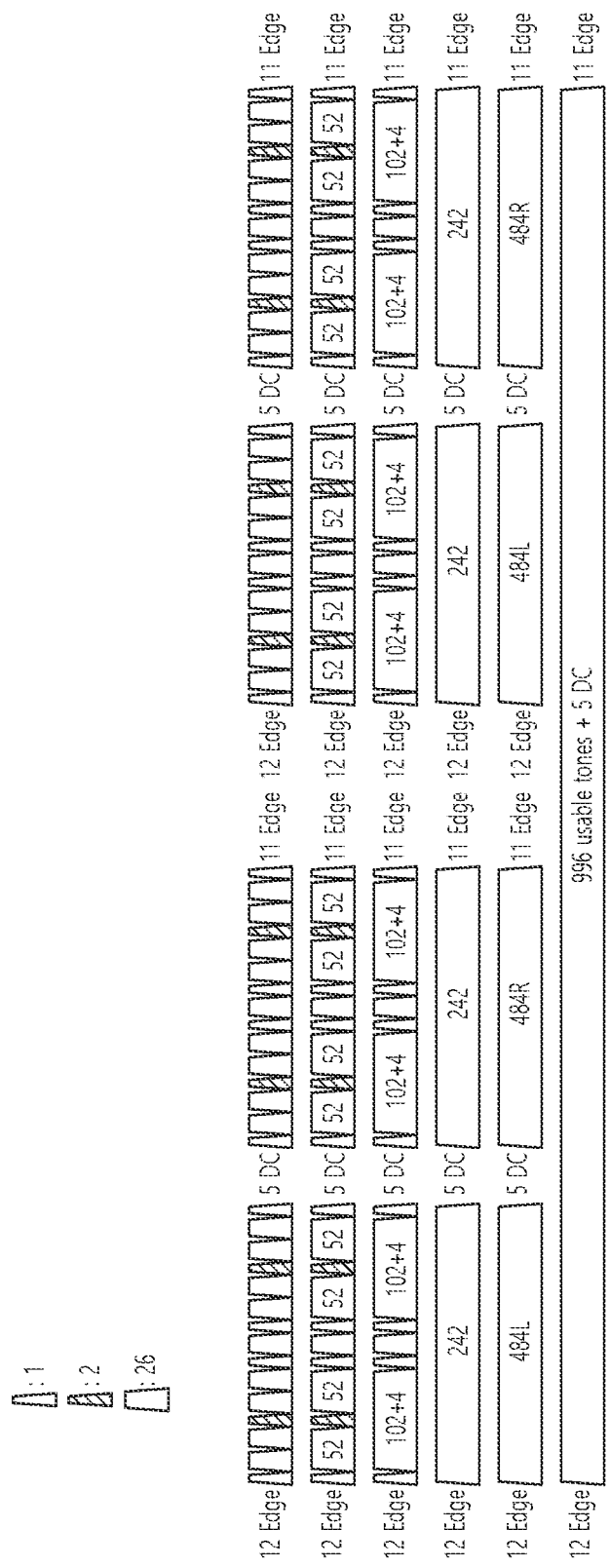
FIG. 8 is a diagram illustrating one embodiment of an 80 MHz OFDMA tone plan.

FIG. 8 is a diagram illustrating one embodiment of an 80 MHz OFDMA tone plan.

Referring to FIG. 8, an 80 MHz OFDMA tone plan can be configured by duplicating the 40 MHz OFDMA tone plan and shifting each +/−20 MHz. For example, 160 MHz, 240 MHz, and 320 MHz tone plans may be configured by duplicating the 80 MHz tone plan. 26-RU, 52-RU, 106-RU, 242-RU, 484-RU, 996-RU, etc. may be used. In addition, 7 DC tones may be inserted at the center frequency, 12 tones are used as a guard band in the leftmost band of the 80 MHz band, and 11 tones are used as a guard band in the rightmost band of the 80 MHz band. In addition, 26-RU using 13 tones located on the left and another 13 tones located on the right of the DC band can be used.

Also, as shown, if used for a single user, a 996-RU may be used, in which case five DC tones may be inserted.

The present specification proposes a 1x EHT-LTF sequence for 240 MHz BW and 320 MHz BW.

If it is used only in a non-OFDMA environment like the existing 11ax, the RU to be considered may be as follows. That is, multiple resource units (RUs) may be used, and combinations of MRUs that may be considered may be as follows.

(1) 4*996RU (320 MHz Full-band use)
(2) 3*996RU (Aggregated BW=240 MHz)
(3) 3*996+484RU (Aggregated BW=280 MHz)

Considering 240 MHz transmission, if it is used only in a non-OFDMA environment like the existing 11ax, the RU to be considered may be as follows.

(4) 2*996RU (Aggregated BW=160 MHz)
(5) 2*996+484RU (Aggregated BW=200 MHz)

That is, if it is only for 320 MHz transmission, an LTF sequence can be created by considering only the aforementioned RU, and in order to create a unified LTF sequence for use in 240 MHz transmission, an optimal sequence including up to 2*996+484 and 2*996 RU should be considered.

In this specification, option 1 is defined as the case in which only the cases (1) to (3) are considered, that is, only 320 MHz transmission is considered. In this specification, option 2 is defined as a case in which both cases (1) to (5) are considered, that is, both 320 MHz transmission and 240 MHz transmission are considered.

In addition, a separate LTF sequence for 240 MHz transmission may be required. The RU size to be considered at this time is as follows (2) to (5).

(2) 3*996RU (240 MHz Full-band use)
(4) 2*996RU (Aggregated BW=160 MHz)
(5) 2*996+484RU (Aggregated BW=200 MHz)

Although additional RU sizes may be added in the future, the proposed sequence can be continuously applied as it is considered not to affect the worst PAPR.

Therefore, in this specification, considering only the above RUs, the best sequence of 1 stream and 1 to 8 streams in the 320 MHz band is proposed as follows.

$EHTLTF_{320MHz\_1x} = \{LTF_{80MHz\_lower1\_1x},$ 23 zeros, $LTF_{80MHz\_upper1\_1x},$ 23 zeros, $LTF_{80MHz\_lower2\_1x},$ 23 zeros, $LTF_{80MHz\_upper2\_1x}\}$ $LTF_{80MHz\_lower1\_1x} = \{S(1)*LTF_{80MHz\_left\_1x},$ 0, $S(2)*LTF_{80MHz\_right\_1x}\}$ $LTF_{80MHz\_upper1\_1x} = \{S(3)*LTF_{80MHz\_left\_1x},$ 0, $S(4)*LTF_{80MHz\_right\_1x}\}$ $LTF_{80MHz\_lower2\_1x} = \{S(5)*LTF_{80MHz\_left\_1x},$ 0, $S(6)*LTF_{80MHz\_right\_1x}\}$ $LTF_{80MHz\_upper2\_1x} = \{S(7)*LTF_{80MHz\_left\_1x},$ 0, $S(8)*LTF_{80MHz\_right\_1x}\}$ Here, 'X zeros' means X number of '0', S(1) to S(8) have a value of '1' or '−1', and $LTF_{80MHz\_left\_1x}$ and $LTF_{80MHz\_right\_1x}$ are as defined above.

In addition, the LTF sequence for 240 MHz transmission may be as follows.

$EHTLTF_{240MHz\_1x} = \{LTF_{80MHz\_lower1\_1x},$ 23 zeros, $LTF_{80MHz\_upper1\_1x},$ 23 zeros, $LTF_{80MHz\_lower2\_1x}\}$ $LTF_{80MHz\_lower1\_1x} = \{S(1)*LTF_{80MHz\_left\_1x},$ 0, $S(2)*LTF_{80MHz\_right\_1x}\}$ $LTF_{80MHz\_upper1\_1x} = \{S(3)*LTF_{80MHz\_left\_1x},$ 0, $S(4)*LTF_{80MHz\_right\_1x}\}$ $LTF_{80MHz\_lower2\_1x} = \{S(5)*LTF_{80MHz\_left\_1x},$ 0, $S(6)*LTF_{80MHz\_right\_1x}\}$ Here, 'X zeros' means X number of '0's, S'(1) to S'(6) have a value of '1' or '−1', and $LTF_{80MHz\_left\_1x}$ and $LTF_{80MHz\_right\_1x}$ are as follows.

$LTF_{80MHz\_left\_1x}$={−1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, +1, 0, 0, 0, −1, 0, 0, −1, 0, 0, −1, 0, 0, 0, −1, 0, 0, 0, −1, 0, 0, 0, −1, 0, 0, 0, +1, 0, 0, +1, 0, 0, 0, −1, 0, 0, 0, −1, 0, 0, 0, +1, 0, 0, 0, −1, 0, 0, +1, 0, 0, −1, 0, 0, 0, −1, 0, 0, 0, −1, 0, 0, −1, 0, 0, 0, 0, −1, 0, 0, 0, +1, 0, 0, 0, +1, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, −1, 0, 0, 0, +1, 0, 0, 0, +1, 0, 0, 0, −1, 0, 0, −1, 0, 0, 0, +1, 0, 0, 0, −1, 0, 0, 0, −1, 0, 0, −1, 0, 0, 0, +1, 0, 0, 0, +1, 0, 0, 0, −1, 0, 0, −1, 0, 0, 0, +1, 0, 0, 0, −1, 0, 0, 0, −1, 0, 0, −1, 0, 0, 0, −1, 0, 0, 0, +1, 0, 0, 0, +1, 0, 0, +1, 0, 0, 0, +1, 0, 0, 0, +1, 0, 0, 0, −1, 0, 0, −1, 0, 0, +1, 0, 0, 0, +1, 0, 0, 0, −1, 0, 0, +1, 0, 0, 0, −1, 0, 0, +1, 0, 0, 0, −1, 0, 0, 0, −1, 0, 0, 0, −1, 0, 0, 0, −1, 0, 0, 0, −1, 0, 0, 0, 0}

$LTF_{80MHz\_right\_1x}$={0, 0, 0, −1, 0, 0, 0, +1, 0, 0, 0, +1, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, +1, 0, 0, 0, +1, 0, 0, 0, −1, 0, 0, 0, −1, 0, 0, 0, +1, 0, 0, +1, 0, 0, 0, −1, 0, 0, 0, +1, 0, 0, 0, −1, 0, 0, 0, +1, 0, 0, 0, 0, 0, −1, 0, 0, 0, +1, 0, 0, 0, +1, 0, 0, 0, −1, 0, 0, 0, +1, 0, 0, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, +1}

Considering multi-stream, option 1 and option 2 in 320 MHz transmission and LTF sequences with low worst peak to average power ratio (PAPR) for 240 MHz transmission can be found as shown in Table 1 below. At this time, considering multi-stream means that the optimal sequence was obtained by considering all streams 1 to 8, and it can be used without change even when it is expanded to 16 streams in the future. If the value of the index in Table 1 is changed to a binary value of 16 bits or 12 bits, '1' becomes '−1' and '0' becomes '1' (or '1' becomes '1' and '0' becomes '−1'), values related to S(1) to S(8) or S(1) to S(6) may be applied. That is, the index of option 1 can be converted to a binary value of 16 bits, and the index of 240 MHz transmission can be converted to a binary value of 12 bits. For example, index 13 of Option 1 is the optimal sequence with worst PAPR=8.46 dB, and S(1) to S(8)='1 1 1 1 −1 −1 1 −1' at this time. In the case of Option 2, if the index is 30, the 1x LTF sequence with S(1)~S(8)='1 1 1 −1 −1 −1 −1 1' has the worst PAPR-9.55 dB. Also, when transmitting at 240 MHz, index 11, that is, S(1) to (6)='1 1 −1 1 −1 −1' may be an optimal sequence. However, since this table lists the index values in the order of worst PAPR when considering the entire RU size, an LTF sequence can be created by selecting another index according to the RU size to be considered. That is, the following sequence may be an optimal sequence for 240 MHz transmission.

$EHTLTF_{240MHz\_1x} = \{LTF_{80MHz\_lower1\_1x},$ 23 zeros, $LTF_{80MHz\_upper1\_1x},$ 23 zeros, $LTF_{80MHz\_lower2\_1x}\}$ $LTF_{80MHz\_lower1\_1x} = \{LTF_{80MHz\_left\_1x},$ 0, $LTF_{80MHz\_right\_1x}\}$ $LTF_{80MHz\_upper1\_1x} = \{-LTF_{80MHz\_left\_1x},$ 0, $LTF_{80MHz\_right\_1x}\}$ $LTF_{80MHz\_lower2\_1x} = \{-LTF_{80MHz\_left\_1x},$ 0, $LTF_{80MHz\_right\_1x}\}$

TABLE 1

| Index | Worst PAPR (dB) |
|---|---|
| Option1 | |
| 13 | 8.46 |
| 6 | 8.52 |

TABLE 1-continued

| Index | Worst PAPR (dB) |
|---|---|
| 9 | 8.55 |
| 61 | 8.63 |
| 71 | 8.64 |
| 62 | 8.73 |
| 104 | 8.77 |
| 46 | 8.84 |
| 58 | 8.84 |
| 29 | 8.84 |
| 53 | 8.84 |
| 79 | 8.85 |
| 26 | 8.87 |
| 33 | 8.88 |
| 41 | 8.88 |
| 96 | 8.91 |
| 83 | 8.93 |
| 18 | 8.98 |
| 66 | 8.98 |
| Option2 | |
| 30 | 9.55 |
| 45 | 9.76 |
| 37 | 9.87 |
| 5 | 9.90 |
| 120 | 9.90 |
| 60 | 9.92 |
| 75 | 9.94 |
| 107 | 9.94 |
| 97 | 10.12 |
| 105 | 10.12 |
| 15 | 10.19 |
| 22 | 10.24 |
| 73 | 10.24 |
| 88 | 10.24 |
| 122 | 10.25 |
| 90 | 10.29 |
| 9 | 10.31 |
| 94 | 10.31 |
| 116 | 10.31 |
| 240 MHz Transmission | |
| 11 | 9.08 |
| 3 | 9.16 |
| 18 | 9.38 |
| 30 | 9.38 |
| 7 | 9.53 |
| 15 | 9.53 |
| 22 | 9.61 |
| 26 | 9.61 |
| 5 | 9.87 |
| 20 | 9.87 |
| 9 | 10.24 |
| 24 | 10.24 |
| 6 | 10.31 |
| 17 | 10.31 |
| 25 | 10.31 |
| 27 | 10.31 |

Hereinafter, a new 1x EHT-LTF sequence or 320 MHz is proposed. If it is used only in a non-OFDMA environment like the existing 11ax, the RU to be considered may be as follows.

1. 4*996RU (320 MHz Full-band use)
2. 3*996RU (Aggregated BW=240 MHz)
3. 3*996+484RU (Aggregated BW=280 MHz)

Therefore, considering only the above RUs, the best sequence for 1 stream and 1 to 8 streams is proposed as follows.

$\text{EHTLTF}_{320MHz\_1x} = \{\text{LTF}_{80MHz\_lower1\_1x}, 23 \text{ zeros}, \text{LTF}_{80MHz\_upper1\_1x}, 23 \text{ zeros}, \text{LTF}_{80MHz\_lower2\_1x}, 23 \text{ zeros}, \text{LTF}_{80MHz\_upper2\_1x}\}$ $\text{LTF}_{80MHz\_lower1\_1x} = \{U(1)*\text{LTF}_{80MHz\_left\_1x}, 0, U(2)*\text{LTF}_{80MHz\_right\_1x}\}$ $\text{LTF}_{80MHz\_upper1\_1x} = \{U(3)*\text{LTF}_{80MHz\_left\_1x}, 0, U(4)*\text{LTF}_{80MHz\_right\_1x}\}$ $\text{LTF}_{80MHz\_lower2\_1x} = \{U(5)*\text{LTF}_{80MHz\_left\_1x}, 0, U(6)*\text{LTF}_{80MHz\_right\_1x}\}$ $\text{LTF}_{80MHz\_upper2\_1x} = \{U(7)*\text{LTF}_{80MHz\_left\_1x}, 0, U(8)*\text{LTF}_{80MHz\_right\_1x}\}$ Here, $\text{LTF}_{80MHz\_left\_1x}$ and $\text{LTF}_{80MHz\_right\_1x}$ are as defined above.

At this time, the value of U(1)~(8) is the value obtained by converting the index value proposed below into an 8-bit binary sequence and then mapping '1' to '−1' and '0' to '1'. Alternatively, '1' can be mapped to '1' and '0' to '−1'. For example, if index is set to 112 and it is converted to binary, it becomes '0111 0000', which can be mapped to a U(1) to U(8) sequence of '1 −1 −1 −1 1 1 1 1'.

TABLE 2

| Index | Worst PAPR |
|---|---|
| Example in which only 1stream-case is considered | |
| 112 | 7.59 |
| 91 | 7.61 |
| 18 | 7.63 |
| 33 | 7.63 |
| 72 | 7.63 |
| 123 | 7.63 |
| 67 | 7.68 |
| 13 | 7.69 |
| 61 | 7.71 |
| 62 | 7.72 |
| 41 | 7.73 |
| 53 | 7.73 |
| 58 | 7.73 |
| 77 | 7.73 |
| 83 | 7.73 |
| 92 | 7.73 |
| 23 | 7.75 |
| 75 | 7.81 |
| 14 | 7.81 |
| 124 | 7.83 |
| 45 | 7.86 |
| 79 | 7.87 |
| 26 | 7.91 |
| 43 | 7.92 |
| 104 | 7.93 |
| 29 | 7.95 |
| 88 | 7.95 |
| 107 | 7.98 |
| 37 | 7.99 |
| Example in which only all of 1stream-case to 8stream case are considered | |
| 13 | 8.46 |
| 6 | 8.52 |
| 9 | 8.55 |
| 61 | 8.63 |
| 71 | 8.64 |
| 62 | 8.73 |
| 104 | 8.77 |
| 46 | 8.84 |
| 58 | 8.84 |
| 29 | 8.84 |
| 53 | 8.84 |
| 79 | 8.85 |
| 26 | 8.87 |
| 33 | 8.88 |
| 41 | 8.88 |
| 96 | 8.91 |
| 83 | 8.93 |
| 18 | 8.98 |
| 66 | 8.98 |
| 11 | 9.01 |
| 72 | 9.02 |
| 77 | 9.02 |
| 92 | 9.02 |
| 111 | 9.05 |
| 123 | 9.05 |

Figure 9:
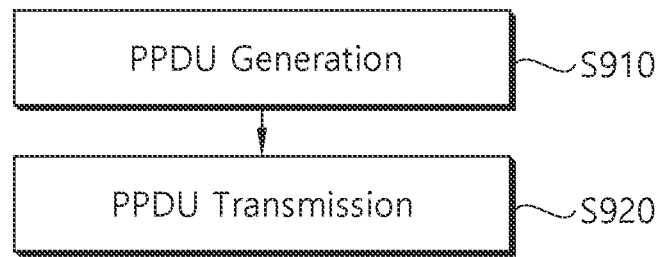
FIG. 9 is a diagram illustrating an embodiment of a method of operating a transmitting STA.

FIG. 9 is a diagram illustrating an embodiment of a method of operating a transmitting STA.

Referring to FIG. 9, the transmitting STA may generate a PPDU (S910).

The transmitting STA may transmit the PPDU (S920). For example, the transmitting STA may transmit the PPDU through a 240 MHz band.

For example, the PPDU may include a Long Training Field (LTF) signal. For example, the LTF signal may be generated based on an LTF sequence for the 240 MHz band. For example, the LTF sequence may be defined as follow's:

{$1^{st}$ sequence, zero sequence, $2^{nd}$ sequence, zero sequence, $3^{rd}$ sequence}, $1^{st}$ sequence={$4^{th}$ sequence, 0, $5^{th}$ sequence}, $2^{nd}$ sequence={-$4^{th}$ sequence, 0, $5^{th}$ sequence}, $3^{rd}$ sequence={-$4^{th}$ sequence, 0, -$5^{th}$ sequence}, $4^{th}$ Sequence={-1, 0, 0, 0, -1, 0, 0, 0, +1, 0, 0, 0, +1, 0, 0, 0, +1, 0, 0, 0, +1, 0, 0, 0, +1, 0, 0, 0, -1, 0, 0, 0, -1, 0, 0, 0, -1, 0, 0, 0, +1, 0, 0, 0, +1, 0, 0, 0, -1, 0, 0, 0, -1, 0, 0, 0, +1, 0, 0, 0, -1, 0, 0, 0, +1, 0, 0, 0, -1, 0, 0, 0, 0, -1, 0, 0, 0, -1, 0, 0, 0, -1, 0, 0, 0, -1, 0, 0, 0, -1, 0, 0, 0, +1, 0, 0, 0, +1, 0, 0, 0, -1, 0, 0, 0, -1, 0, 0, 0, +1, 0, 0, 0, -1, 0, 0, 0, -1, 0, 0, 0, -1, 0, 0, 0, -1, 0, 0, 0, -1, 0, 0, 0, -1, 0, 0, 0, +1, 0, 0, 0, +1, 0, 0, 0, -1, 0, 0, 0, -1, 0, 0, 0, +1, 0, 0, 0, -1, 0, 0, 0, +1, 0, 00, -1, 0, 0, 0, +1, 0, 0, 0, +1, 0, 0, 0, +1, 0, 0, 0, +1, 0, 0, 0, +1, 0, 0, 0, -1, 0, 0, 0, -1, 0, 0, 0, +1, 0, 0, 0, +1, 0, 0, 0, -1, 0, 0, 0, +1, 0, 0, 0, -1, 0, 0, 0, +1, 0, 0, 0, -1, 0, 0, 0, -1, 0, 0, 0, -1, 0, 0, 0, -1, 0, 0, 0, +1, 0, 0, 0, -1, 0, 0, 0, -1, 0, 0, 0, -1, 0, 0, 0, -1, 0, 0, 0, -1, 0, 0, 0, -1, 0, 00, +1, 0, 0, 0, +1, 0, 0, 0, +1, 0, 00, -1, 0, 0, 0, -1, 0, 0, 0, +1, 0, 00, +1, 0, 0, 0, -1, 0, 0, 0, +1, 0, 0, 0, -1, 0, 0, 0, +1, 0, 0, 0, +1, 0, 0, 0, +1, 0, 0, 0, +1, 0, 0, 0, +1, 0, 0, 0, +1, 0, 0, 0, -1, 0, 0, 0, -1, 0, 0, 0, +1, 0, 0, 0, +1, 0, 0, 0, -1, 0, 0, 0, +1, 0, 0, 0, -1, 0, 0, 0, +1, 0, 0, 0, +1, 0, 0, 0, +1, 0, 0, 0, +1, 0, 0, 0, -1, 0, 0, 0, +1, 0, 0, 0, +1, 0, 0, 0, -1, 0, 0, 0, -1, 0, 0, 0, +1, 0, 0, 0, -1, 0, 0, 0, +1, 0, 0, 0, -1, 0, 0, 0, +1, 0, 0, 0, +1, 0, 0, 0, +1, 0, 0, 0, +1, 0, 0, 0, -1, 0, 0, 0, -1, 0, 0, 0, +1, 0, 0, 0, +1, 0, 0, 0, -1, 0, 0, 0, -1, 0, 0, 0, +1, 0, 0, 0, -1, 0, 0, 0, -1, 0, 0, 0, -1, 0, 0, 0, -1, 0, 0, 0, +1, 0, 0, 0, -1, 0, 0, 0, +1, 0, 0, 0, -1, 0, 0, 0, -1, 0, 0, 0}, $5^{th}$ sequence={0, 0, 0, -1, 0, 0, 0, +1, 0, 0, 0, +1, 0, 0, 0, -1, 00, 0, -1, 0, 0, 0, +1, 0, 0, 0, +1, 0, 0, 0, -1, 0, 0, 0, -1, 0, 0, 0, +1, 0, 0, 0, +1, 0, 0, 0, -1, 0, 0, 0, +1, 0, 0, -1, 0, 0, 0, +1, 0, 0, 0, +1, 0, 0, 0, +1, 0, 0, 0, +1, 0, 0, 0, +1, 0, 0, 0, -1, 0, 0, 0, -1, 0, 0, 0, +1, 0, 0, 0, +1, 0, 0, 0, -1, 0, 0, 0, +1, 0, 0, 0, -1, 0, 0, 0, 0, +1, 0, 0, 0, +1, 0, 0, 0, +1, 0, 0, 0, +1, 0, 0, 0, +1, 0, 0, 0, -1, 0, 0, 0, -1, 0, 0, 0, +1, 0, 0, 0, +1, 0, 0, 0, -1, 0, 0, 0, +1, 0, 0, 0, -1, 0, 0, 0, -1, 0, 0, 0, -1, 0, 0, 0, -1, 0, 0, 0, -1, 0, 0, 0, -1, 0, 0, 0, +1, 0, 0, 0, +1, 0, 0, 0, -1, 0, 0, 0, -1, 0, 0, 0, +1, 0, 0, 0, -1, 0, 0, +1, 0, 0, 0, -1, 0, 0, 0, +1, 0, 0, 0, +1, 0, 0, 0, +1, 0, 0, 0, +1, 0, 0, 0, -1, 0, 0, 0, +1, 0, 0, 0, -1, 0, 0, 0, +1, 0, 0, 0, +1, 0, 0, 0, -1, 0, 0, 0, +1, 0, 0, 0, +1, 0, 0, 0, -1, 0, 0, 0, -1, 0, 0, 0, +1, 0, 0, 0, +1, 0, 0, 0, +1, 0, 0, 0, +1, 0, 0, 0, +1, 0, 0, 0, +1, 0, 0, 0, -1, 0, 0, 0, -1, 0, 0, 0, +1, 0, 0, 0, +1, 0, 0, 0, +1, 0, 0, 0, -1, 0, 0, 0, +1, 0, 0, 0, +1, 0, 0, 0, -1, 0, 0, 0, +1, 0, 0, 0, +1, 0, 0, 0, +1, 0, 0, 0, -1, 0, 0, 0, -1, 0, 0, 0, +1, 0, 0, 0, -1, 0, 0, 0, +1, 0, 0, 0, +1, 0, 0, 0, -1, 0, 0, 0, -1, 0, 0, 0, +1, 0, 0, 0, +1, 0, 0, 0, +1, 0, 0, 0, -1, 0, 0, 0, -1, 0, 0, 0, -1, 0, 0, 0, -1, 0, 0, 0, -1, 0, 0, 0, +1, 0, 0, 0, -1, 0, 0, 0, -1, 0, 0, 0, -1, 0, 0, 0, +1}

Figure 10:
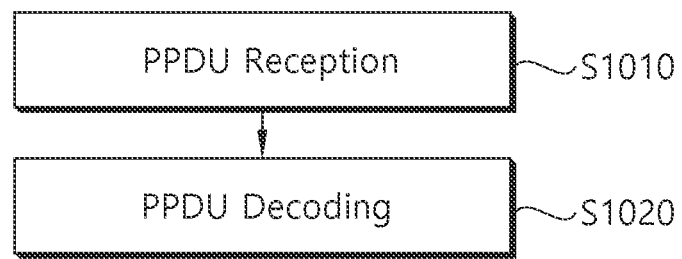
FIG. 10 is a diagram illustrating an embodiment of a method of operating a receiving STA.

FIG. 10 is a diagram illustrating an embodiment of a method of operating a receiving STA.

Referring to FIG. 10, the receiving STA may receive the PPDU (S1010). For example, the receiving STA may receive the PPDU through a 240 MHz band.

The receiving STA may decode the PPDU (S1020).

For example, the PPDU may include a Long Training Field (LTF) signal. For example, the LTF signal may be generated based on an LTF sequence for the 240 MHz band. For example, the LTF sequence may be defined as follows:

{$1^{st}$ sequence, zero sequence, $2^{nd}$ sequence, zero sequence, $3^{rd}$ sequence}, $1^{st}$ sequence={$4^{th}$ sequence, 0, $5^{th}$ sequence}.

$2^{nd}$ sequence={-$4^{th}$ sequence, 0, $5^{th}$ sequence}

$3^{rd}$ sequence={-$4^{th}$ sequence, 0, -$5^{th}$ sequence}, $4^{th}$ sequence={-1, 0, 0, 0, -1, 0, 0, 0, +1, 0, 0, 0, +1, 0, 0, 0, +1, 0, 0, 0, +1, 0, 0, 0, +1, 0, 0, 0, -1, 0, 0, 0, -1, 0, 0, 0, -1, 0, 0, 0, +1, 0, 0, 0, +1, 0, 0, 0, -1, 0, 0, 0, -1, 0, 0, 0, +1, 0, 0, 0, -1, 0, 0, 0, +1, 0, 0, 0, -1, 0, 0, 0, 0, -1, 0, 0, 0, -1, 0, 0, 0, -1, 0, 0, 0, -1, 0, 0, 0, -1, 0, 0, 0, +1, 0, 0, 0, +1, 0, 0, 0, -1, 0, 0, 0, -1, 0, 0, 0, +1, 0, 0, 0, -1, 0, 0, 0, +1, 0, 0, 0, -1, 0, 0, 0, -1, 0, 0, 0, -1, 0, 0, 0, +1, 0, 0, 0, +1, 0, 0, 0, -1, 0, 0, 0, -1, 0, 0, 0, +1, 0, 0, 0, -1, 0, 0, 0, +1, 0, 0, 0, +1, 0, 0, 0, +1, 0, 0, 0, -1, 0, 0, 0, -1, 0, 0, 0, +1, 0, 0, 0, 0, +1, 0, 0, 0, -1, 0, 0, 0, -1, 0, 0, 0, -1, 0, 0, 0, +1, 0, 0, 0, -1, 0, 0, 0, -1, 0, 0, 0, -1, 0, 0, 0, -1, 0, 0, 0, -1, 0, 0, 0, -1, 0, 0, 0, +1, 0, 0, 0, +1, 0, 0, 0, +1, 0, 0, 0, -1, 0, 0, 0, -1, 0, 0, 0, +1, 0, 0, 0, +1, 0, 0, 0, -1, 0, 0, 0, +1, 0, 0, 0, -1, 0, 0, 0, +1, 0, 0, 0, +1, 0, 0, 0, +1, 0, 0, 0, -1, 0, 0, 0, -1, 0, 0, 0, +1, 0, 0, 0, +1, 0, 0, 0, -1, 0, 0, 0, +1, 0, 0, 0, -1, 0, 0, 0, +1, 0, 0, 0, +1, 0, 0, 0, +1, 0, 0, 0, +1, 0, 0, 0, +1, 0, 0, 0, -1, 0, 0, 0, +1, 0, 0, 0, +1, 0, 0, 0, -1, 0, 0, 0, -1, 0, 0, 0, +1, 0, 0, 0, -1, 0, 0, 0, -1, 0, 0, 0, +1, 0, 0, 0, +1, 0, 0, 0, +1, 0, 0, 0, +1, 0, 0, 0, -1, 0, 0, 0, -1, 0, 0, 0, +1, 0, 0, 0, +1, 0, 0, 0, -1, 0, 0, 0, -1, 0, 0, 0, +1, 0, 0, 0, -1, 0, 0, 0, +1, 0, 0, 0, -1, 0, 0, 0, -1, 0, 0, 0, +1, 0, 0, 0, -1, 0, 0, 0, -1, 0, 0, 0}, $5^{th}$ sequence={0, 0, 0, -1, 0, 0, 0, +1, 0, 0, 0, +1, 0, 0, -1, 0, 0, 0, -1, 0, 0, 0, +1, 0, 0, 0, -1, 0, 0, 0, -1, 0, 0, 0, +1, 0, 0, 0, +1, 0, 0, 0, -1, 0, 0, 0, +1, 0, 0, 0, -1, 0, 0, 0, +1, 0, 0, 0, +1, 0, 0, 0, +1, 0, 0, 0, +1, 0, 0, 0, +1, 0, 0, 0, +1, 0, 0, 0, -1, 0, 0, 0, -1, 0, 0, 0, +1, 0, 0, 0, +1, 0, 0, 0, -1, 0, 0, 0, +1, 0, 0, 0, -1, 0, 0, 0, +1, 0, 0, 0, +1, 0, 0, 0, +1, 0, 0, 0, +1, 0, 0, 0, +1, 0, 00, -1, 0, 0, 0, -1, 0, 0, 0, +1, 0, 0, 0, +1, 0, 0, 0, -1, 0, 0, 0, 0, +1, 0, 0, 0, -1, 0, 0, 0, +1, 0, 0, 0, -1, 0, 0, 0, -1, 0, 0, 0, 0, -1, 0, 0, 0, -1, 0, 0, 0, -1, 0, 0, 0, +1, 0, 0, 0, +1, 0, 0, 0, -1, 0, 0, 0, -1, 0, 0, 0, +1, 0, 0, 0, -1, 0, 0, 0, +1, 0, 0, 0, +1, 0, 0, 0, +1, 0, 0, 0, +1, 0, 0, 0, -1, 0, 0, 0, +1, 0, 0, 0, +1, 0, 0, 0, -1, 0, 0, 0, -1, 0, 0, 0, +1, 0, 0, 0, +1, 0, 0, 0, +1, 0, 0, 0, +1, 0, 0, 0, +1, 0, 0, 0, +1, 0, 0, 0, -1, 0, 0, 0, -1, 0, 0, 0, +1, 0, 0, 0, +1, 0, 0, 0, -1, 0, 0, 0, +1, 0, 0, 0, +1, 0, 0, 0, +1, 0, 0, 0, -1, 0, 0, 0, -1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1}

Some of the detailed steps shown in the examples of FIGS. 9 and 10 may not be essential steps and may be omitted. In addition to the steps shown in FIGS. 9 and 10, other steps may be added, and the order of the steps may be changed. Some of the above steps may have their own technical meaning.

The technical features of the present specification described above may be applied to various devices and methods. For example, the technical features of the present specification described above may be performed/supported through the device of FIGS. 1 and/or 7. For example, the technical features of the present specification described above may be applied only to a part of FIGS. 1 and/or 7. For example, the technical features of the present specification described above are implemented based on the processing chips 114 and 124 of FIG. 1, or implemented based on the processors 111 and 121 and the memories 112 and 122 of FIG. 1, may be implemented based on the processor 610 and the memory 620 of FIG. 7. For example, an apparatus of the present specification may include a memory; and a processor operatively coupled to the memory, wherein the processor is adapted to: generate a physical protocol data unit (PPDU); and transmit the PPDU through a 240 MHz band, wherein the PPDU includes a long training field (LTF) signal, wherein the LTF signal is generated based on an LTF sequence for the 240 MHz band, wherein the LTF sequence is defined as follows:

{$1^{st}$ sequence, zero sequence, $2^{nd}$ sequence, zero sequence, $3^{rd}$ sequence}, $1^{st}$ sequence={$4^{th}$ sequence, 0, $5^{th}$ sequence), $2^{nd}$ sequence={−$4^{th}$ sequence, 0, $5^{th}$ sequence}, $3^{rd}$ sequence={−$4^{th}$ sequence, 0, −$5^{th}$ sequence}.

$4^{th}$ sequence=(−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, −1, 0, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, 0, +1, 0, 0, 0, −1, 0, 0, 0, +1, 0, 0, 0, +1, 0, 0, 0, 0, +10, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, 0, −1, 0, 0, 0, +1, 0, 0, 0, +1, 0, 0, 0, −1, 0, 0, 0, −1, 0, 0, 0, 0, 0, +1, 0, 0, 0, −1, 0, 0, 0, +1, 0, 0, 0, −1, 0, 00, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, 0, 0, −1, 0, 0, 0, −1, 0, 0, 0}, $5^{th}$ sequence={0, 0, 0, −1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, +1, 0, 00, −1, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, 0, +1, 0, 0, 0, −1, 0, 0, 0, −1, 0, 0, 0, +1, 0, 0, 0, −1, 0, 0, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, 0, −1, 0, 0, 0, −1, 0, 0, 0}, Technical features of the present specification may be implemented based on a computer readable medium (CRM). At least one computer readable medium (CRM) proposed by the present specification may store instructions that, based on being executed by at least one processor of a wireless local area network (WLAN) system, perform operations comprising: generating a physical protocol data unit (PPDU); and transmitting the PPDU through a 240 MHz band, wherein the PPDU includes a long training field (LTF) signal, wherein the LTF signal is generated based on an LTF sequence for the 240 MHz band, wherein the LTF sequence is defined as follows:

{$1^{st}$ sequence, zero sequence, $2^{nd}$ sequence, zero sequence, $3^{nd}$ sequence}, $1^{st}$ sequence={$4^{th}$ sequence, 0, $5^{th}$ sequence), $2^{nd}$ sequence={−$4^{th}$ sequence, 0, $5^{th}$ sequence), $3^{rd}$ sequence={31 $4^{th}$ sequence, 0, −$5^{th}$ sequence), $4^{th}$ sequence={−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, 0, 0, −1, 0, 0, 0, −1, 0, 0, 0, +1, 0, 0, 0, −1, 0, 0, 0, +1, 00, 0, −1, 0, 0, 0, +1, 0, 0, 0, +1, 00, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, +1, 0, 0, 0, 0, −1, 0, 0, 0, −1, 0, 0, 0, −1, 0, 0, 0, −1, 0, 0, 0, 0, 0, −1, 0, 0, 0, +1, 00, 0, +1, 0, 0, 0, +1, 0, 00, −1, 0, 0, 0, +1, 0, 0, 0, +1, 00, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, 0, +1, 0, 0, 0, +1, 0, 0, 0, −1, 0, 0, 0, +1, 0, 0, 0, −1, 0, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, +1, 0, 0, 0, 0, −1, 0, 0, 0, −1, 0, 0, 0}, 5$^{th}$ sequence={0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, −1, 0, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, 0, +1, 0, 0, 0, −1, 0, 0, 0, −1, 0, 0, +1, 0, 0, 0, 0, +1, 0, 0, 0, −1, 0, 0, 0, −1, 0, 0, +1, 0, 0, 0, 0, +1, 0, 0, 0, +1, 0, 00, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1}

Instructions stored in the CRM of the present specification may be executed by at least one processor. At least one processor related to the CRM of the present specification may be the processors 11I and 121 or the processing chips 114 and 124 of FIG. 1 or the processor 610 of FIG. 7. Meanwhile, the CRM of this specification may be the memories 112 and 122 of FIG. 1, the memory 620 of FIG. 7, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image. AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to ahead-mount display (HMD), ahead-up display (HUD), a mobile phone, a tablet PC, a laptop computer, a desktop computer, a T, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics

What is claimed is:

1. A method performed in a wireless local area network (WLAN) system, the method comprising:
   generating an extremely high throughput (EHT) physical protocol data unit (PPDU),
   wherein the EHT PPDU further includes a legacy-signal (L-SIG) field, a repeated L-SIG (RL-SIG) field which is a repeat of the L-SIG field, a universal signal (U-SIG) field, an EHT signal (EHT-SIG) field, an EHT short training field (EHT-STF) signal, and an EHT long training field (EHT-LTF) signal; and
   transmitting the EHT PPDU,
   wherein the L-SIG includes a length a length field which is set to satisfy a condition that a remainder is zero (0) when the value of the length field is divided by three (3), and the remainder is used to differentiate the EHT PPDU from a High Efficiency (HE) PPDU,
   wherein the U-SIG field includes version independent fields followed by version dependent fields,
   wherein the version independent fields include 3-bit information related to a physical (PHY) version identifier (ID) of the EHT PPDU, 1-bit information related to uplink (UL) and downlink (DL) direction,
   wherein the version independent field includes PPDU-type information related to whether the EHT PPDU is for single-user (SU) transmission or multi-user (MU) transmission,
   wherein the U-SIG field further includes bandwidth information indicating 240 MHz, and EHT-LTF type information indicating a type of the EHT-LTF signal,
   wherein the EHT-LTF signal is generated based on an EHT-LTF sequence,
   wherein the EHT-LTF sequence is defined as follows:
   {$1^{st}$ sequence, zero sequence, $2^{nd}$ sequence, zero sequence, $3^{rd}$ sequence},
   $1^{st}$ sequence={$4^{th}$ sequence, 0, $5^{th}$ sequence},
   $2^{nd}$ sequence={$-4^{th}$ sequence, 0, $5^{th}$ sequence},
   $3^{rd}$ sequence={$-4^{th}$ sequence, 0, $-5^{th}$ sequence},
   $4^{th}$ sequence={−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, −1, 0, 0, 0, −1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0}, $5^{th}$ sequence={0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, 0, −1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, +1}.

2. The method of claim 1, wherein the zero-sequence means 23 contiguous zeros.

3. The method of claim 1, wherein the PPDU is transmitted through a multiple resource unit (MRU), and
   wherein the MRU is configured as a combination of three 996-tone resource units (RUs), a combination of two 996-tone RUs and one 484-tone RU, or a combination of two 996-tone RUs.

4. A station (STA) of a wireless local area network (WLAN) system, the STA comprising:
   a transceiver transmitting and/or receiving a wireless signal; and
   a processor coupled to the transceiver,
   wherein the processor is adapted to:
   generate an extremely high throughput (EHT) physical protocol data unit (PPDU),
   wherein the EHT PPDU further includes a legacy-signal (L-SIG) field, a repeated L-SIG (RL-SIG) field which is a repeat of the L-SIG field, a universal signal (U-SIG) field, an EHT signal (EHT-SIG) field, an EHT short training field (EHT-STF) signal, and an EHT long training field (EHT-LTF) signal; and
   transmit the EHT PPDU,
   wherein the L-SIG includes a length a length field which is set to satisfy a condition that a remainder is zero (0) when the value of the length field is divided by three (3), and the remainder is used to differentiate the EHT PPDU from a High Efficiency (HE) PPDU,
   wherein the U-SIG field includes version independent fields followed by version dependent fields,
   wherein the version independent fields include 3-bit information related to a physical (PHY) version identifier (ID) of the EHT PPDU, 1-bit information related to uplink (UL) and downlink (DL) direction, wherein the version independent field includes PPDU-type information related to whether the EHT PPDU is for single-user (SU) transmission or multi-user (MU) transmission, wherein the U-SIG field further includes bandwidth information indicating 240 MHz, and EHT-LTF type information indicating a type of the EHT-LTF signal, wherein the EHT-LTF signal is generated based on an EHT-LTF sequence, wherein the EHt-LTF sequence is defined as follows:

{$1^{st}$ sequence, zero sequence, $2^{nd}$ sequence, zero sequence, $3^{rd}$ sequence}, $1^{st}$ sequence={$4^{th}$ sequence, 0, $5^{th}$ sequence}, $2^{nd}$ sequence={$-4^{th}$ sequence, 0, $5^{th}$ sequence}, $3^{rd}$ sequence={$-4^{th}$ sequence, 0, $-5^{th}$ sequence}, $4^{th}$ sequence={−1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, −1, 0, 0, 0, 0, 0, −1, 0, 0, 0, −1, 0, 0, 0, −1, 0, 0, 0, −1, 0, 0, 0, −1, 0, 0, 0, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, 0, +1, 0, 0, 0, −1, 0, 0, 0, +1, 0, 0, 0, +1, 0, 0, 0, +1, 0, 0, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, 0, −1, 0, 0, 0, +1, 0, 0, 0, +1, 0, 0, 0, −1, 0, 0, 0, −1, 0, 0, 0, 0, 0, +1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0}, $5^{th}$ sequence={0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, 0, +1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, +1, 0, 0, 0, −1, 0, 0, 0, +1, 0, 0, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, 0, +1, 0, 0, 0, +1, 0, 0, 0, −1, 0, 0, 0, −1, 0, 0, 0, +1, 0, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, +1}.

5. The STA of claim 4, wherein the zero-sequence means 23 contiguous zeros.

6. The STA of claim 4, wherein the EHT PPDU is transmitted through a multiple resource unit (MRU), and
   wherein the MRU is configured as a combination of three 996-tone resource units (RUs), a combination of two 996-tone RUs and one 484-tone RU, or a combination of two 996-tone RUs.

* * * * *